(12) United States Patent
Haas et al.

(10) Patent No.: US 9,036,025 B2
(45) Date of Patent: May 19, 2015

(54) SYSTEM AND METHOD FOR INEXPENSIVE RAILROAD TRACK IMAGING FOR INSPECTION

(75) Inventors: Norman Haas, Mount Kisco, NY (US); Ying Li, Mohegan Lake, NY (US); Charles A. Otto, Lansing, MI (US); Sharathchandra Pankanti, Darien, CT (US)

(73) Assignee: International Business Macines Corporation, Armonk, NY (US)

( * ) Notice: Subject to any disclaimer, the term of this patent is extended or adjusted under 35 U.S.C. 154(b) by 514 days.

(21) Appl. No.: 13/348,326

(22) Filed: Jan. 11, 2012

(65) Prior Publication Data

US 2013/0176435 A1    Jul. 11, 2013

(51) Int. Cl.
| | |
|---|---|
| *H04N 7/18* | (2006.01) |
| *B61K 9/08* | (2006.01) |
| *B61L 23/04* | (2006.01) |
| *B61L 27/00* | (2006.01) |
| *G01B 11/245* | (2006.01) |
| *G06K 9/20* | (2006.01) |

(52) U.S. Cl.
CPC .. *H04N 7/18* (2013.01); *B61K 9/08* (2013.01); *B61L 23/044* (2013.01); *B61L 23/045* (2013.01); *B61L 23/047* (2013.01); *B61L 23/048* (2013.01); *B61L 27/0088* (2013.01); *G01B 11/245* (2013.01); *G06K 9/209* (2013.01); *G06K 2209/19* (2013.01)

(58) Field of Classification Search
None
See application file for complete search history.

(56) References Cited

U.S. PATENT DOCUMENTS

| | | | |
|---|---|---|---|
| 1,601,080 | A | 9/1926 | Otis |
| 4,181,430 | A | 1/1980 | Shirota et al. |
| 4,531,837 | A | 7/1985 | Panetti |
| 4,577,494 | A | 3/1986 | Jaeggi |
| 5,956,664 | A | 9/1999 | Bryan |
| 6,195,204 | B1 | 2/2001 | Nalwa |
| 7,616,329 | B2 | 11/2009 | Villar et al. |
| 7,755,660 | B2 | 7/2010 | Nejikovsky et al. |
| 2006/0087453 | A1* | 4/2006 | Iwane ............................ 340/988 |

(Continued)

FOREIGN PATENT DOCUMENTS

| | | |
|---|---|---|
| EP | 1577440 | 9/2005 |
| WO | 90/08012 | 7/1990 |

OTHER PUBLICATIONS

International Search Report and Written Opinion dated Mar. 26, 2013 for PCT/US13/20979.

(Continued)

*Primary Examiner* — William C Vaughn, Jr.
*Assistant Examiner* — Eileen Adams
(74) *Attorney, Agent, or Firm* — Jose Gutman; Fleit Gibbons Gutman Bongini & Bianco PL

(57) ABSTRACT

An imaging system includes an image capturing device and a plurality of reflective devices. The image capturing device is configured to receive a plurality of images reflected by the plurality of reflective devices. Responsive to receiving the plurality of images, the image capturing device is further configured to capture within a single frame at least a first image corresponding to a first side of a first railroad track rail, a second image corresponding to a second side of the first railroad track rail, a third image corresponding to a first side of a second railroad track rail, and a fourth image corresponding to a second side of the second railroad track rail.

17 Claims, 7 Drawing Sheets

(56) References Cited

U.S. PATENT DOCUMENTS

| | | |
|---|---|---|
| 2007/0299338 A1 | 12/2007 | Stevick et al. |
| 2009/0040503 A1* | 2/2009 | Kilian et al. ............... 356/23 |
| 2009/0049936 A1 | 2/2009 | Mian et al. |
| 2010/0076631 A1 | 3/2010 | Mian |
| 2011/0181721 A1 | 7/2011 | Bloom et al. |

OTHER PUBLICATIONS

International Preliminary Report on Patentability dated Jul. 15, 2014 for International Application No. PCT/US2013/020979.

* cited by examiner

400

SYSTEM AND METHOD FOR INEXPENSIVE RAILROAD TRACK IMAGING FOR INSPECTION

FIELD OF THE INVENTION

The present invention generally relates to imaging systems, and more particularly relates to a railroad track imaging system.

BACKGROUND OF THE INVENTION

According to recent safety statistics published by the Federal Railroad Administration (FRA), the total impact of damage caused by all reported derailment accidents in the US amounts to hundreds of millions of dollars annually, more than 10% of which were due to track problems. For safety and efficiency reasons, railroad track inspection for physical defects and irregularities is required to be performed on a regular basis in order to maintain a high standard of track condition. Rail inspection generally includes a wide variety of specific tasks, ranging from locating and evaluating the condition of different rail fastener components (tie plates, anchors, joint bars, etc.) to monitoring rail surfaces, alignments and curvatures, to detecting sequence-level track design non-compliances.

SUMMARY OF THE INVENTION

In one embodiment, an imaging system is disclosed. The imaging system comprises a first image capturing device and a first plurality of reflective devices. The first image capturing device has a field of view. A first reflective device in the first plurality of reflective devices is configured to reflect an image corresponding to a first side of a first railroad track rail within a first portion of the field-of-view of the first image capturing device. A second reflective device in the first plurality of reflective devices is configured to reflect an image corresponding to a second side of the first railroad track rail within a second portion of the first image capturing device's field-of-view. A third portion of the first image capturing device's field-of-view corresponds to a top surface of the first railroad track rail.

In another embodiment, another imaging system is disclosed. This imaging system comprises an image capturing device, a first plurality of reflective devices, and at least a second plurality of reflective devices. The image capturing device has a field of view. A first reflective device in the first plurality of reflective devices is configured to reflect a first image corresponding to a first side of a first railroad track rail to a first reflective device in the second plurality of reflective devices. The first reflective device in the second plurality of reflective devices is configured to reflect the first image within a first portion of a field-of-view of the image capturing device. A second reflective device in the first plurality of reflective devices is configured to reflect a second image corresponding to a first side of a second railroad track rail to a second reflective device in the second plurality of reflective devices. The second reflective device in the second plurality of reflective devices is configured to reflect the second image within a second portion of the image capturing device's field-of-view.

In yet another embodiment, an image capturing device is disclosed. The image capturing device comprises a support structure, an image capturing device, and a plurality of reflective devices. The support structure comprises a first horizontal member and a second horizontal member that is situated opposite to the first horizontal member. A third horizontal member is situated above and parallel to the first horizontal member. A fourth horizontal member is situated above and parallel to the second horizontal member. A first vertical member coupled and perpendicular to the first and third horizontal members. At least a second vertical member coupled and perpendicular to the second and fourth horizontal members. A sixth horizontal member is coupled to the first and second vertical members. A seventh horizontal member is coupled and perpendicular to the second and third horizontal members. A first reflective device in the plurality of reflective devices is coupled to at least one of the sixth horizontal member and the first vertical member. A second reflective device in the plurality of reflective devices is coupled to at least one of the sixth horizontal member and the second vertical member. The image capturing device is coupled to the seventh horizontal member.

In another embodiment, an imaging system is disclosed. The imaging system comprises a single image capturing device and a plurality of reflective devices. The single image capturing device is configured to receive a plurality of images reflected by the plurality of reflective devices. Responsive to receiving the plurality of images, the single image capturing device is further configured to capture within a single frame at least a first image corresponding to a first side of a first railroad track rail, a second image corresponding to a second side of the first railroad track rail, a third image corresponding to a first side of a second railroad track rail, and a fourth image corresponding to a second side of the second railroad track rail.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Railroad Track Imaging System

As discussed above, rail inspection generally includes a wide variety of specific tasks such as evaluating the condition of different rail fastener components (tie plates, anchors, joint bars, etc.). Conventional railroad track imaging systems typically require multiple cameras to collect a sufficient number of images for high-quality imaging. The use of multiple cameras can create problems with respect to camera synchronization, image registration, and bandwidth. Additionally, implementing multiple cameras can also increase system costs.

Therefore, one or more embodiments of the present invention provide a low-cost railroad track imaging system that utilizes a combination of reflective devices and image capturing devices. The use of reflective devices reduces the number of image capturing devices required for imaging, thereby reducing the overall cost of the system. Embodiments of the present invention can utilize various mechanisms for capturing and analyzing images. For example, on-line image capturing and analysis can be utilized as well as a separate on-line image capturing process with off-line (or direct on-line) analysis of the captured images. Embodiments of the present invention can also capture images and utilize manual (human) image analysis as well.

Figure 1:
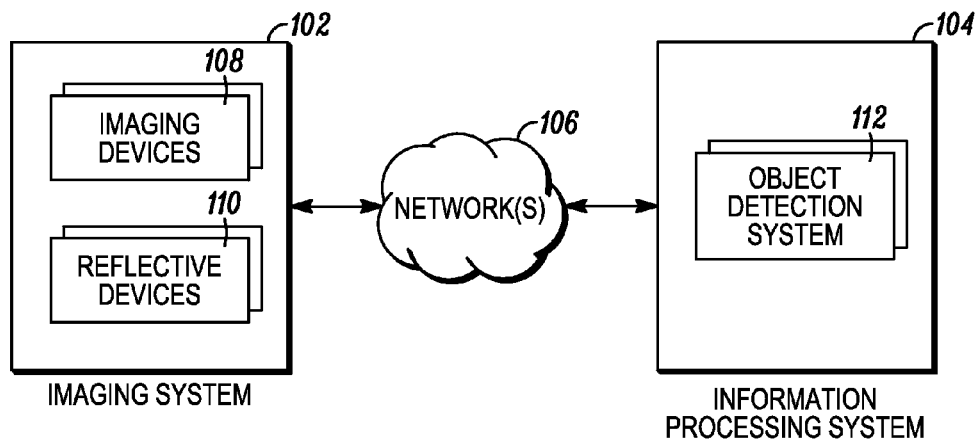
FIG. 1 is a block diagram illustrating a high level overview of a system for capturing images of a railroad track according to one embodiment of the present invention.

FIG. 1 shows one example of a system 100 for performing railroad track imaging and inspection according to one embodiment of the present invention. In particular, FIG. 1 shows a railroad track imaging system 102 communicatively coupled to one or more optional information processing systems 104. In one embodiment a network(s) 106 (wired and/or wireless) communicatively couples the imaging system 102 and information processing system 104.

Figure 8:
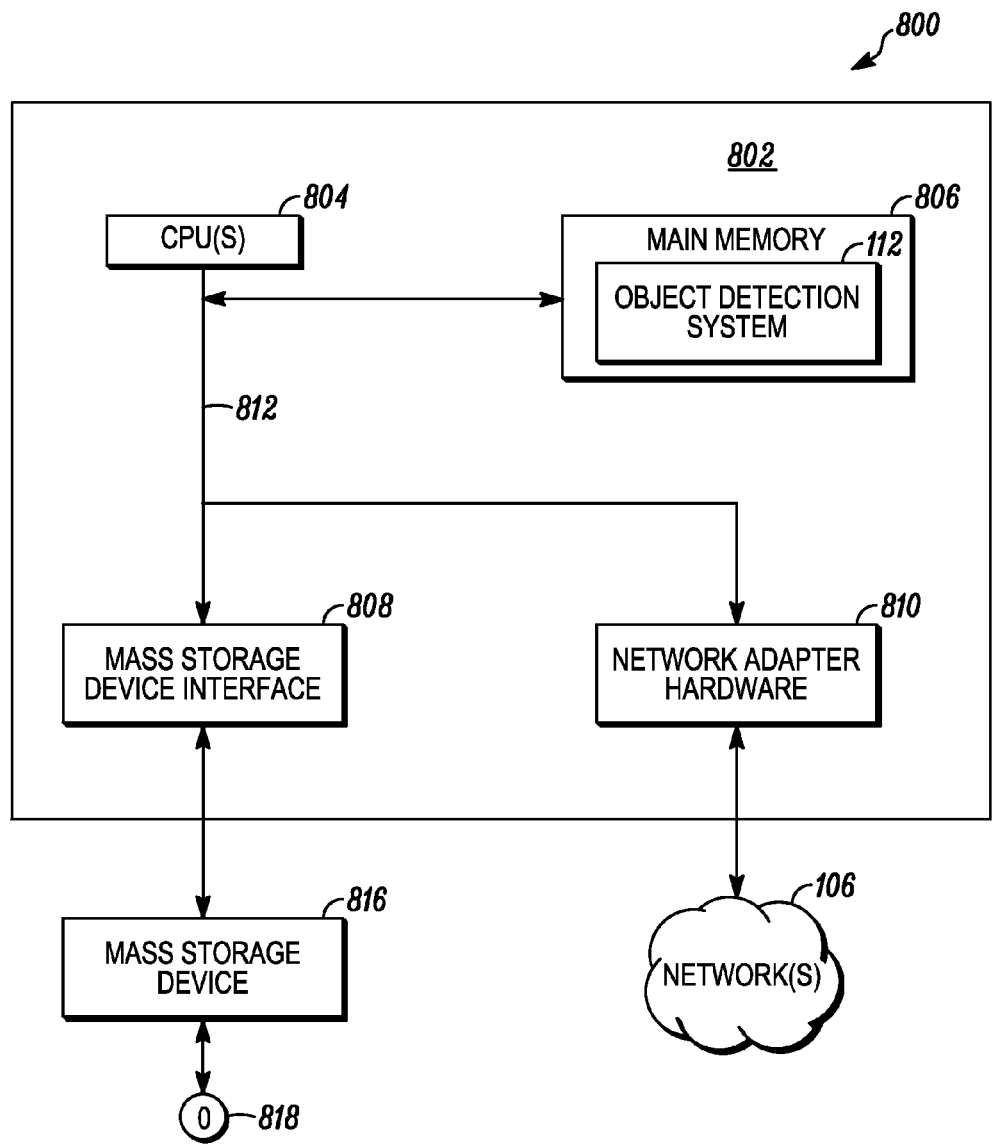
FIG. 8 illustrates an example of an information processing system suitable for use with the system for capturing images of a railroad track shown in FIG. 1.

FIG. 8 is a block diagram illustrating an information processing system that can be utilized in embodiments of the present invention. The information processing system 800 is based upon a suitably configured processing system adapted to implement one or more embodiments of the present invention (e.g., the system 104 of FIG. 1). Any suitably configured processing system can be used as the information processing system 800 in embodiments of the present invention. The information processing system 800 comprises one or more processor(s) 804 that are connected to a main memory 806, mass storage interface 808, and network adapter hardware 810. A system bus 812 interconnects these system components. The main memory 806 stores an object detection system 112 as discussed with regards to FIG. 1. The network adapter hardware 810 is coupled with one or more networks 106. The mass storage device interface 808 is coupled with a mass storage device 816 which can be coupled with mass storage media 818.

As will be discussed in greater detail below, the railroad track imaging system 102 comprises a plurality of reflective devices 110, such as planar mirrors, concave minors, convex minors, plano-convex mirrors, plano-concave minors, saddle-shaped minors, and/or the like. These mirrors can be front (first) surface minors where light coming towards the minor is reflected back without passing into the glass of the minor, rear (second) surface mirrors where the reflective plating facing inwards, or the like. The railroad track imaging system 102 also comprises one or more image capturing devices 108, such as cameras.

The image capturing devices 108, in one embodiment, are cameras that capture images/frames of a video sequence or still photo sequence of an external environment. It should be noted that if multiple image capturing devices 108 are implemented two or more of these devices can have overlapping fields of view. The reflective devices 110 are situated within the railroad track imaging system 102 to provide a single image capturing device 108 with multiple views of the external environment, which in one embodiment is a railroad track and its components (e.g., ties, tie plates, anchors, joint bars, etc.). This allows a single image capturing device 108 to capture multiple views of the track at substantially the same time.

The information processing system 104 receives the images/frames captured by the by image capturing devices 108. These images/frames are then processed/analyzed by an object detection system 112 in the information processing system 104 to identify objects within the images 108 and defects and/or irregularities associated with these objects. For example, the object detection system 112 identifies objects of interest such as a railroad track and its components (e.g., ties, tie plates, anchors, joint bars, etc.) and determines if these objects have any defects and/or irregularities such as, but not limited to, missing ties, missing spikes, damaged joint bars, damaged rails, etc. A more detailed discussion on image processing can be found in the commonly owned and co-pending U.S. application Ser. No. 13/085,985 entitled "Object Recognition Using HAAR Features and Histograms of Oriented Gradients", and the commonly owned and co-pending U.S. application Ser. No. 13/086,023 entitled "Detection of Objects in Digital Images", which are both hereby incorporated by reference in their entireties. A more detailed discussion on image analysis for railroad track inspection can be found in the commonly owned publication entitled "Component-Based Track Inspection Using Machine-Vision Technology", Li et al., ICMR'11, April 2011, which is hereby incorporated by reference in its entirety.

Figure 2:
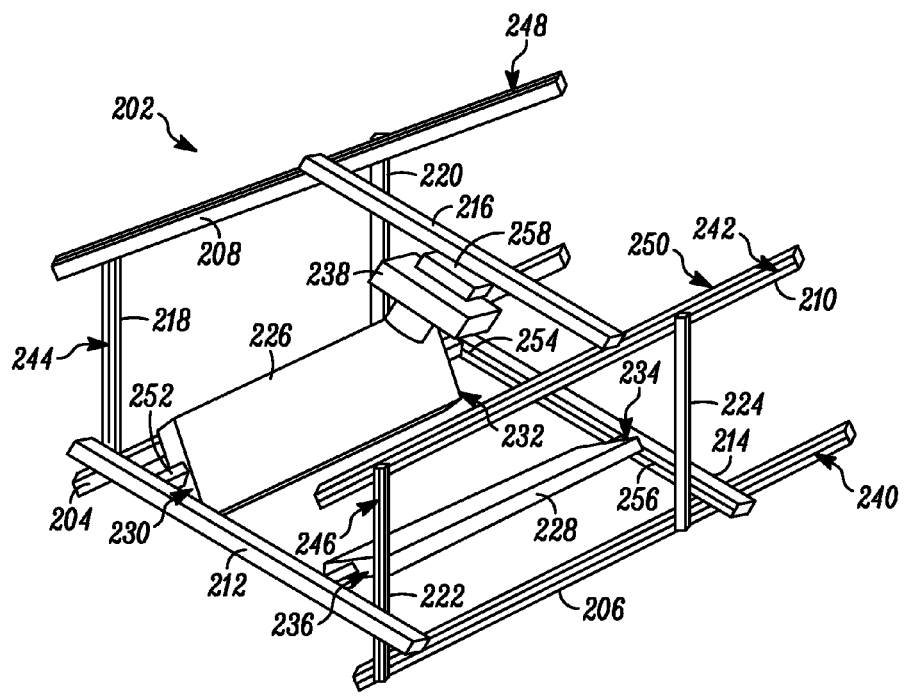
FIG. 2 is a top-side perspective view of a support structure for an railroad track imaging system according to one embodiment of the present invention.

FIG. 2 shows a top-side view of the railroad track imaging system 102 according to one embodiment. In the example shown in FIG. 2 the railroad track imaging system 102 comprises a support structure 202 for supporting one or more image capturing devices 238 and reflective devices 226, 228. It should be noted that a single support structure 202 can be utilized for inspecting the entire railroad track or a separate structure can be used for each of the right rails and left rails of the railroad track.

In the example of FIG. 2, the support structure 202 comprises a plurality of horizontal members 204, 206, 208, 210, 212, 214, 216 and a plurality of vertical members 218, 220, 222, 224. A first horizontal member 204 is situated opposite a second horizontal member 206. A third horizontal member 208 is situated above and parallel to the first horizontal member 204. A fourth horizontal member 210 is situated above and parallel to the second horizontal member 206, and also opposite and parallel to the third horizontal member 208.

A first vertical member 218 is coupled and perpendicular to the first and third horizontal members 204, 208. A second vertical member 220 is also coupled and perpendicular to the first and third horizontal members 204, 208. The first and second vertical members 218, 220 are parallel to each other. A third vertical member 222 is coupled and perpendicular to the second and fourth horizontal members 206, 210. A fourth vertical member 224 is also coupled and perpendicular to the second and fourth horizontal members 206, 210. The third and fourth vertical members 222, 224 are parallel to each other.

A fifth horizontal member 212 is coupled and perpendicular to the first and third vertical members 218, 222. A sixth horizontal member 214 is coupled and perpendicular to the second and fourth vertical members 220, 224, and is also situated opposite the fifth horizontal member 212. The fifth and sixth horizontal members 212, 214 are parallel to each other. A seventh horizontal member 216 is coupled and perpendicular to the second and third horizontal members 208, 210, and parallel to the fifth and sixth horizontal members, 212, 214. The fifth, sixth, and seventh horizontal members 212, 214, 216 are perpendicular to the first, second, third, and fourth horizontal members 204, 206, 208, 210. It should be noted that, in other embodiments, only one of the fifth and sixth horizontal members 212, 214 is included within the structure 202. It should also be noted that, in other embodiments, only one of the first and second vertical members 218, 220 and only one of the third and fourth vertical members 222, 224 are included within the structure 202.

At least two reflective devices 226, 228 are coupled to the fifth and sixth horizontal members 212, 214. For example, a first end 230, 232 of the reflective devices 226, 228 and a second end 234, 236, which are situated opposite the first end 230, 232, of the reflective devices 226, 228 are coupled to the fifth and sixth horizontal members 212, 214, respectively. In another embodiment, each of the fifth and sixth horizontal members 212, 214 are composed multiple separate pieces. For example, a first separate horizontal member can be coupled to the first end 230 of the first reflective device 226 and the first vertical member 218. A second separate horizontal member can be coupled to both the second end 232 of the first reflective device 226 and the second vertical member 220. The same configuration can apply to the second reflective device 228 and the third and fourth vertical members 222, 224. FIG. 2 also shows that an image capturing device(s) 238 is coupled to the seventh horizontal member 216.

In one embodiment, the first and second vertical members 218, 220 are movably coupled to the first and third horizontal members 204, and the third and fourth vertical members 222, 224 are movably coupled to the second and fourth horizontal members 206, 210. For example, the first, second, third, and fourth horizontal members 204, 206, 208, 210 can comprise a track system 240, 242 that allows the vertical members 218, 220, 222, 224 to slide/move in a lateral direction with respect to the horizontal members 204, 206, 208, 210. However, any other mechanism can be used to movably couple the vertical members to their respective horizontal members. It should be noted that locking mechanisms (not shown) can also be implemented to lock/fix the vertical members 218, 220, 222, 224 at a given position with respect to their respective horizontal members.

As the vertical members 218, 220, 222, 224 move along their corresponding horizontal members 204, 206, 208, 210 the fifth and sixth horizontal members 212, 214 also move along the same path since they are coupled to the vertical members 218, 220, 222, 224. In one embodiment, the fifth and sixth horizontal members 212, 214 are movably coupled to the first, second, third, and fourth vertical members 218, 220, 222, 224, respectively. For example, the first, second, third, and fourth vertical members 218, 220, 222, 224 can comprise a track system 244, 246 that allows the horizontal members 212, 214 to slide/move in a vertical direction. However, any other mechanism can be used to movably couple the fifth and sixth horizontal members 212, 214 to the vertical members 218, 220, 222, 224. It should be noted that locking mechanisms (not shown) can also be implemented to lock/fix the fifth and sixth horizontal members 212, 214 at a given position with respect to their corresponding vertical members.

The seventh horizontal member 216 can also be movably coupled to the second and third horizontal members 208, 210. For example, the second and third horizontal members 208, 210 can comprise a track system 248, 250 that allows the seventh horizontal member 216 to slide/move in a horizontal/lateral direction with respect to the second and third horizontal members 208, 210. However, any other mechanism can be used to movably couple the seventh horizontal member 216 to the second and third horizontal members 208, 210. It should be noted that locking mechanisms (not shown) can also be implemented to lock/fix the seventh horizontal member 216 at a given position with respect to the second and third horizontal members 208, 210.

The reflective devices 226, 228 can be pivotably coupled to the fifth and sixth horizontal members 212, 214, respectively, via one or more pivoting members. For example, a first pivoting member 252 can pivotably couple the first end 230 of the first reflective device 226 to the fifth horizontal member 212. A second pivoting member 254 can pivotably couple the second end 232 of the first reflective device 226 to the sixth horizontal member 214. A similar configuration is also applicable to the second reflective device 228. This allows the first and second reflective devices 226, 228 to be adjusted (e.g., rotated/pivoted) with respect to the external environment and the image capturing device(s) 238.

In another embodiment, the first and second reflective devices 226, 228 can be movably coupled to each of the fifth and sixth horizontal members 212, 214. For example, the fifth and sixth horizontal members 212, 214 can comprise a track system 256 that allows the first and second reflective devices 226, 228 to slide/move in a horizontal/lateral direction (e.g., toward/away from the first/second and third/fourth horizontal members 204, 206, 208, 210). In one embodiment, the pivoting members 252, 254 are movably coupled to the track 256 and allow the reflective devices 226, 228 to move in the horizontal/lateral direction. However, any other mechanism can be used to movably couple the first and second reflective devices 226, 228 to the fifth and sixth horizontal members 212, 214. It should be noted that locking mechanisms (not shown) can also be implemented to lock/fix the first and second reflective devices 226, 228 at a given position with respect to the fifth and sixth horizontal members 212, 214.

The image capturing device(s) 238 can be pivotably coupled to the seventh horizontal member 216 via one or more pivoting members. For example, a pivoting member 258 can pivotably couple the image capturing device(s) 238 to the seventh horizontal member 216. This allows the image capturing device(s) 238 to be adjusted with respect to the external environment and the reflective devices 226, 228. The image capturing device(s) 238 can also be movably coupled to the seventh horizontal member 216 as well. For example, the seventh horizontal member 216 can comprise a track system (not shown) that allows the image capturing device(s) 238 to slide/move in a horizontal/lateral direction (e.g., toward/away from the first/second and third/fourth horizontal members 204, 206, 208, 210). In one embodiment, the pivoting member 258 is movably coupled to the track. However, any other mechanism can be used to movably couple the image capturing device(s) 238 to the seventh horizontal member 216. It should be noted that locking mechanisms (not shown) can also be implemented to lock/fix the image capturing device(s) 238 at a given position with respect to seventh horizontal member 216. It should be noted that one or more horizontal/vertical members, image capturing devices, and reflective devices, can be added and/or removed from the structure shown in FIG. 2

The support structure 202 comprising the imaging system 102, in one embodiment, can be coupled to a vehicle. In one embodiment, this vehicle rides on or along a railroad track and utilizes the system 102 to perform imaging/inspection operations thereon. As the vehicle travels along the railroad track, the imaging system 102 captures one or more images/frames associated with the track that can be processes by the information processing system 104 either in real time or at a later point in time.

Figure 3:
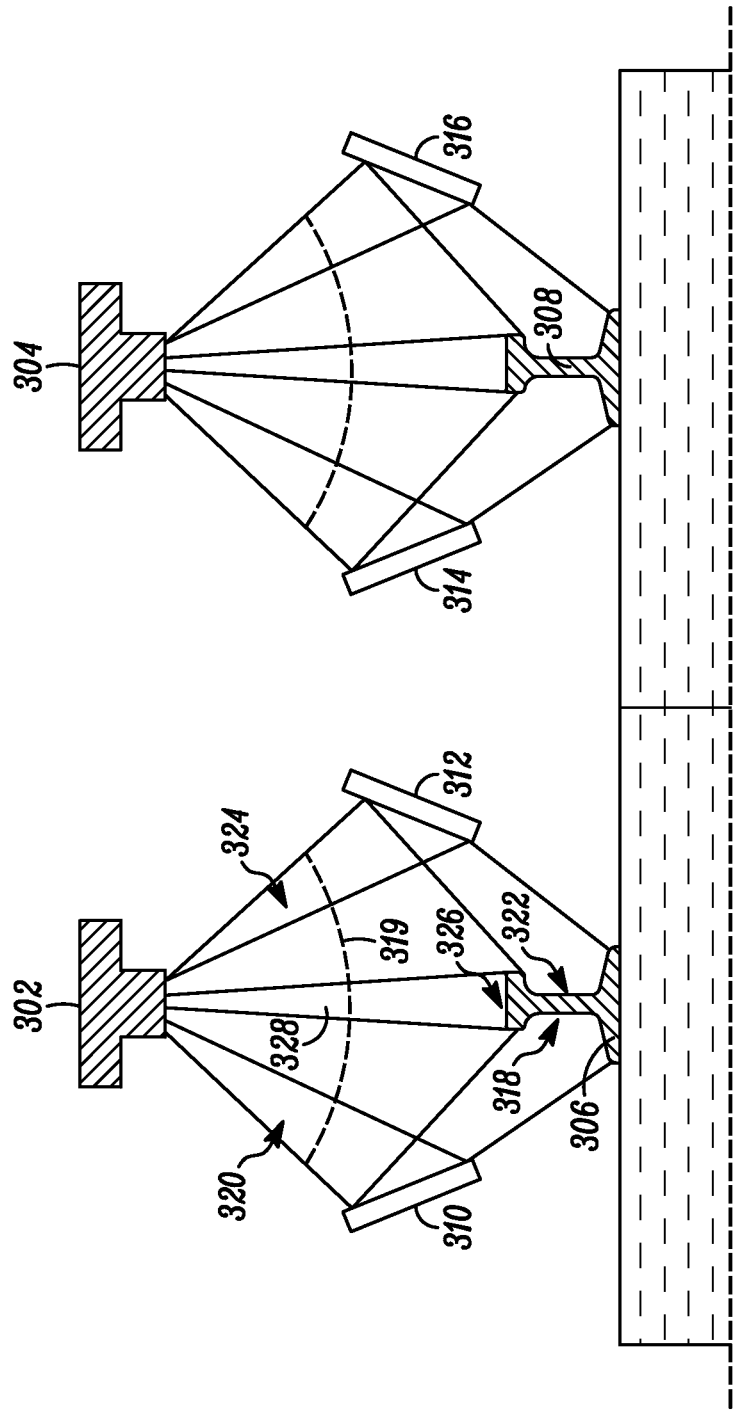
FIG. 3 illustrates one configuration of a railroad track imaging system implementing at least two image capturing devices and multiple reflective devices according to one embodiment of the present invention.

For example, FIG. 3 shows one configuration of the railroad track imaging system 102. In this embodiment, the railroad track imaging system 102 comprises two cameras 302, 304 one for each rail 306, 308 of the track. Each camera 302, 304 is associated with two reflective devices such as minors 310, 312, 314, 316. It should be noted that the support structure 202 is not shown in FIG. 3 for simplicity. The configuration shown in FIG. 2 allows the imaging system 102 to capture at least six views (at least three views per camera 302, 304) using only two cameras 302, 304 as compared to six cameras.

For example, a first mirror 310 associated with the first camera 302 is positioned and angled such that it reflects an image of a first side 318 (e.g., left side) of the first rail 306 (e.g., left rail) in a first portion 320 of the field-of-view 319 of the first camera 302. A second mirror 312 associated with the first camera 302 is positioned and angled such that it reflects an image of a second side 322 (e.g., right side) of the first rail 306 in a second portion 324 of the field-of-view 319 of the first camera 302. In the example shown in FIG. 2, the first camera 302 is positioned above its associated mirrors 310, 312 and the first rail 306. The first camera 302 is positioned on the support structure 202 such that the top portion 326 of the rail is within a third portion 328 of its field-of-view 319. The second camera 304 and mirrors 314, 316 are configured similar to the first camera 302 and mirrors 310, 312 discussed above. The cameras 302, 304 and the mirrors 310, 312, 314, 316 can be positioned/adjusted to change the images received by cameras 302, 304. Each of the first and second cameras 302, 304 and mirrors 310, 312, 314, 316 can be adjusted (e.g., moved, tilted, etc.) independent from one another either manually and/or automatically.

Figure 4:
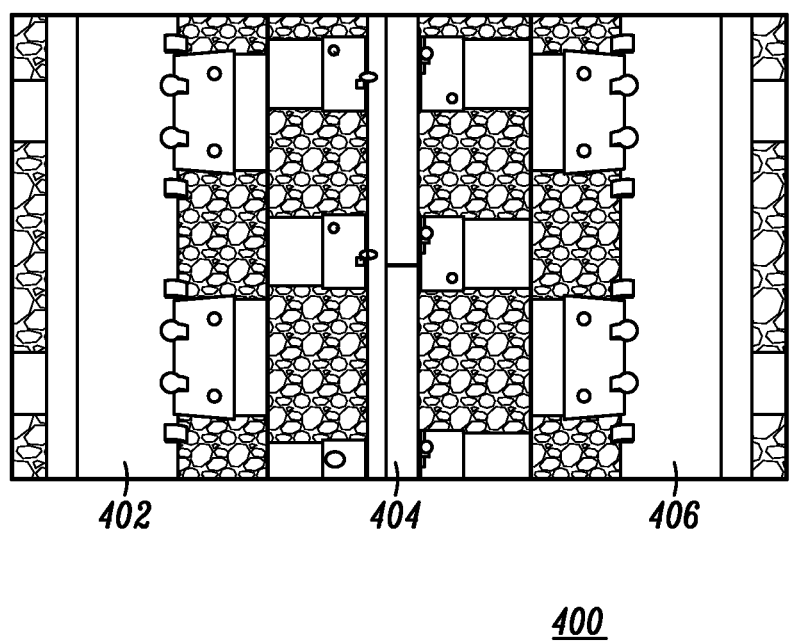
FIG. 4 illustrates one example of an image/frame captured by the imaging system configuration of FIG. 3 according to one embodiment of the present invention.

Thus, the first camera 302 captures one or more images comprising a first side 318 of the first rail 306, a second side 322 of the first rail 306, and a top portion 326 of the first rail 306. The second camera 304 captures one or more images comprising a first side of the second rail 308, a second side of the second rail 308, and a top portion 326 of the second rail 308. FIG. 4 shows one example of an image/frame 400 comprised of the various portions of the rail within the field-of-view 319 of the first camera 302 using the configuration shown in FIG. 3. As can be seen, the image/frame 400 comprises a top view 402 of the first rail 306, a right side view 404 of the first rail 306, and a left side view 406 of the first rail 306.

Figure 5:
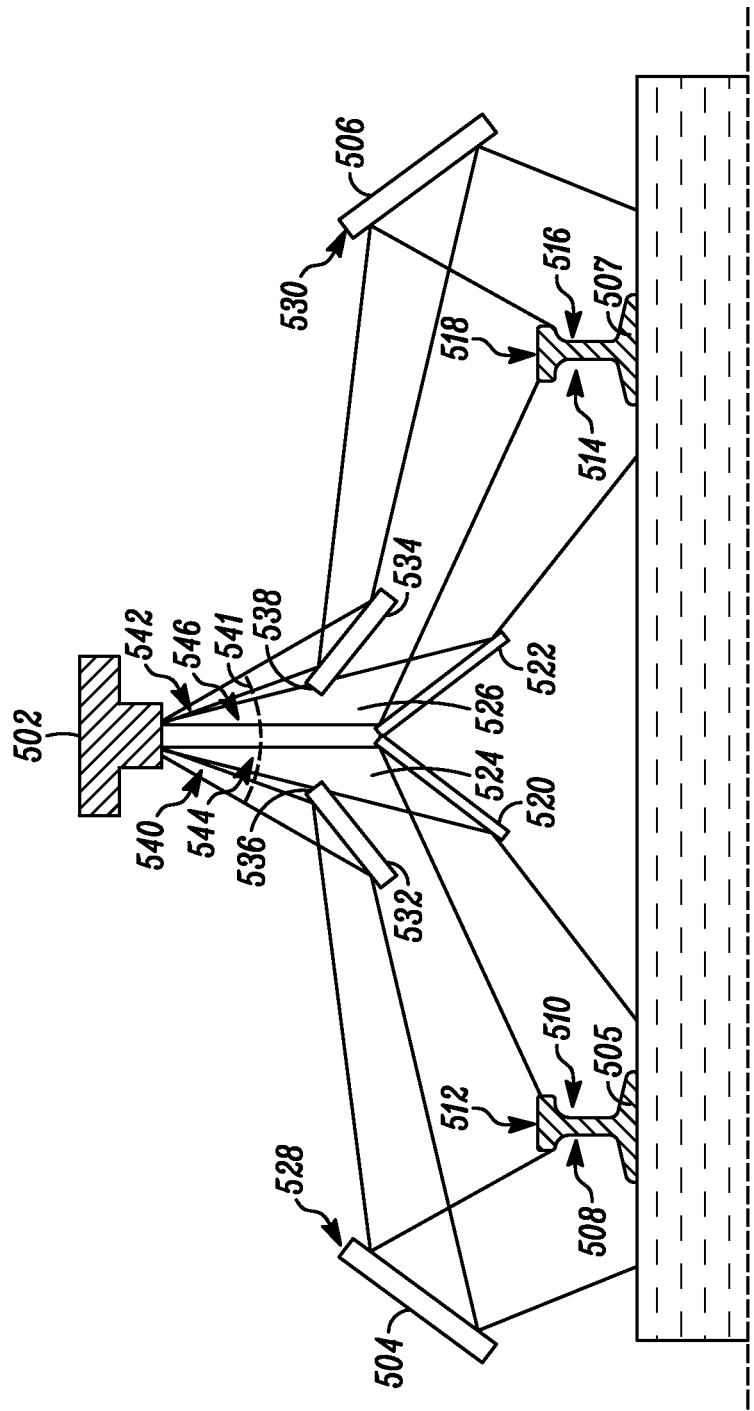
FIG. 5 illustrates one configuration of a railroad track imaging system implementing one image capturing device and multiple reflective devices according to one embodiment of the present invention.

FIG. 5 shows another configuration of the railroad track imaging system 102. In this example, only a single image capturing device such as a camera 502 is required to capture each exposed side/face of each rail. For example, a first outer mirror 504 is situated on the support structure 202 beyond the outer (e.g., left) side/face 508 of the first (e.g., left) rail 505. A second outer mirror 506 is situated on the support structure 202 beyond the outer (e.g., right) side/face 516 of the second (e.g., right) rail 507. In one embodiment, the first and second outer minors 504, 506 are situated within the same plane as each other. A first lower inner mirror 520 is situated on the support structure 202 between the first rail 505 and the second rail 507, where the first lower inner mirror 520 corresponds to the first rail 505. A second lower inner mirror 522 is also situated on the support structure 202 between the first rail 505 and the second rail 507, where the second lower inner minor 522 corresponds to the second rail 507 and is situated closer to the second rail 507 than the first lower inner minor 520. In one embodiment, the first and second lower inner mirrors 520, 522 are situated within the same plane as each other. Also, the first and second lower inner mirrors 520, 522, in one embodiment, are situated at least partially below the first and second outer minors 504, 506. In this embodiment, at least a top most portion 524, 526 of the first and second lower inner mirrors 520, 522 are below a top most portion 528, 530 of the first and second outer minors 506, 508.

A first upper inner mirror 532 is situated on the support structure 202 between the first rail 505 and the second rail 507, where the first upper inner minor 532 corresponds to the first outer mirror 504 and the first rail 505. A second upper inner minor 534 is also situated on the support structure 202 between the first rail 505 and the second rail 507. The second upper inner mirror 534 corresponds to the second outer minor 506 and the second rail 507, where the second upper inner minor 534 is situated closer to the second rail 507 than the first lower upper minor 532. In one embodiment, the first and second upper inner minors 532, 534 are situated within the same plane as each other. The distance between the first and second upper inner minors 532, 534 is greater than the distance between the first and second lower inner minors 520, 522. In one embodiment, the first and second upper inner mirrors 532, 534 are situated at least partially above the first and second outer minors 505, 506. In this embodiment, at least a top most portion 536, 538 of the first and second lower upper minors are above the top most portion 528, 530 of the first and second outer mirrors.

In the configuration shown in FIG. 5, the first upper inner minor 532 is positioned and angled such that it receives a reflection from the first outer mirror 504. The first outer mirror 504 is positioned and angled such that it reflects an image of the first side 508 (e.g., left side) of the first rail 505 to the first upper inner mirror 532. The first upper inner mirror 532 is also positioned and angled such that it reflects the image received from the first outer mirror 504 within a first portion 540 of the field-of-view 541 of the camera 502. The second upper inner mirror 534 is positioned and angled such that it receives a reflection from the second outer mirror 506. The second outer mirror 506 is positioned and angled such that it reflects an image of a first side 516 (e.g., right side) of the second rail 507 to the second upper inner mirror 534. The second upper inner mirror 534 is also positioned and angled such that it reflects the image received from the second outer minor 506 within a second portion 542 of the field-of-view 541 of the camera 502.

The first lower inner mirror 520 is positioned and angled such that it reflects an image of a second side 510 (e.g., right side) of the first rail 505 to a third portion 544 of the camera's field-of-view 541. The second lower inner mirror 522 is positioned and angled such that it reflects an image of a second side 514 (e.g., left side) of the second rail 507 to a fourth portion 546 of the camera's field-of-view 541. Therefore, the combination of the first outer mirror 504 and the first upper inner mirror 532 present an image of a first side/face 508 of the first rail 505 to the camera 502 to the first portion 540 of the field-of-view 541 of the camera 502. The combination of the second outer mirror 506 and the second upper inner mirror 534 present an image of a first side/face 516 of the second rail 507 to the second portion 542 of the field-of-view 541 of the camera 502. The first lower inner mirror 520 presents an image of the second side/face 510 of the first rail 505 to the third portion 544 of the field-of-view 541 of the camera 502. The second lower inner mirror 522 presents an image of the second side/face of the second rail 507 to the fourth portion 546 of the field-of-view 541 of the camera 502. It should be noted that one or more mirrors and can be added/removed to present an image/reflection of the top side/face 512, 518 of the first and second rails 505, 507 to the camera 502. In addition, one or more of the existing mirrors shown in FIG. 5 can be adjusted to also present an image/reflection of the top side/face 512, 518 of the first and second rails 505, 507 (in addition to the views discussed above) to the camera 502.

Figure 6:
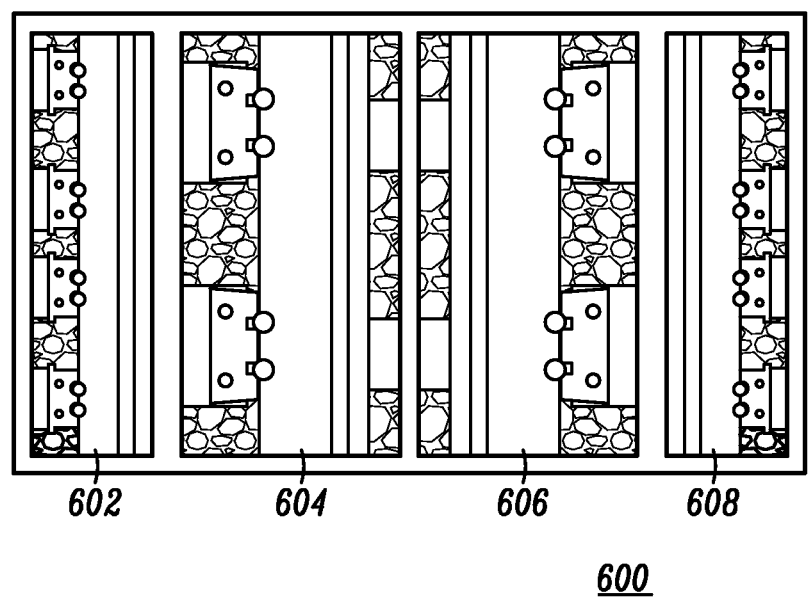
FIG. 6 illustrates one example of an image/frame captured by the imaging system configuration of FIG. 5 according to one embodiment of the present invention.

FIG. 6 shows one example of an image/frame 600 comprised of the various portions of the rail within the field-of-view of the first camera using the configuration shown in FIG. 5. As can be seen, the image/frame 600 comprises a left side/face view 602 of the first rail 505, a right side/face view 604 of the first rail 505, a left side/face view 606 of the second rail 507, and a right side/face view 608 of the second rail 507. As discussed above, a top view of the first and second rails can also be included in this image/frame as well.

Figure 7:
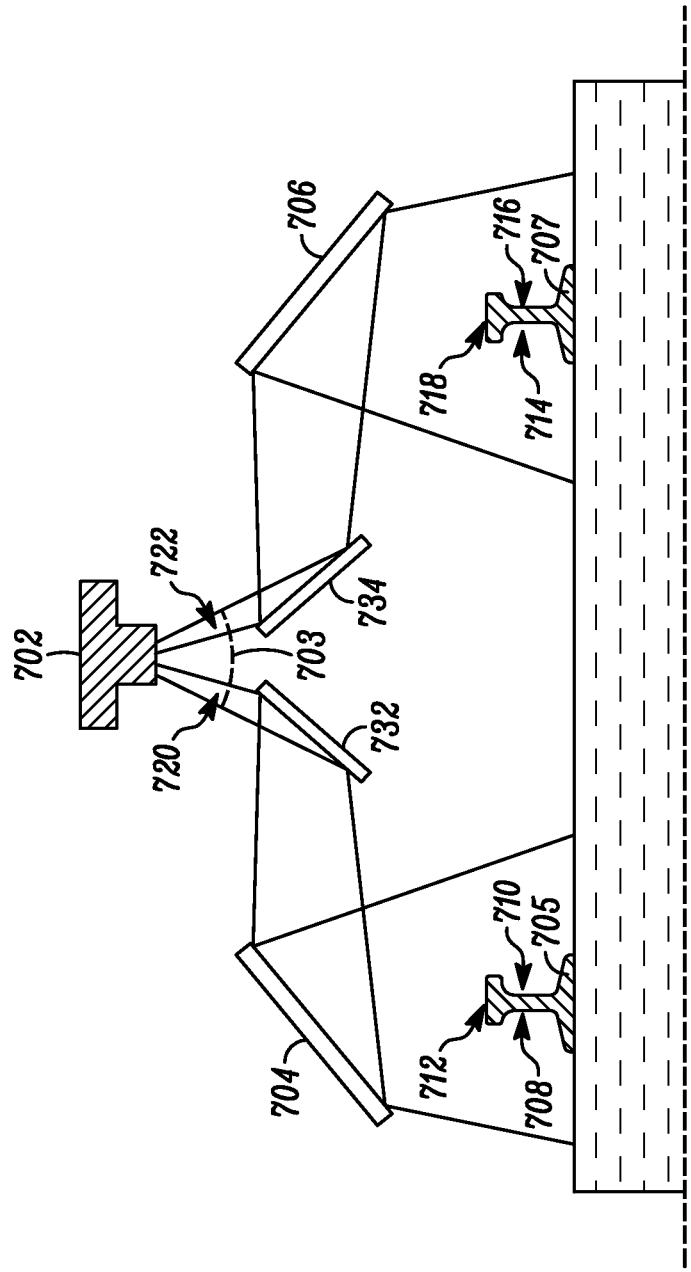
FIG. 7 illustrates another configuration of a railroad track imaging system implementing one image capturing device and multiple reflective devices according to one embodiment of the present invention.

FIG. 7 shows another configuration of the railroad track imaging system 102. In this configuration, a single camera and four mirrors are utilized to provide the camera with a wide spacing of images visible in its field-of-view 703. In other words, the camera is provided with a top-down view of both rails simultaneously, and the areas surrounding the rails, on both sides. For example, a first outer mirror 704 is situated on the support structure 202 such that it extends over a top portion 712 of the first rail 705 and extends beyond the first side 708 and the second side 710 of the first rail 705. A second outer mirror 706 is situated on the support structure 202 such that it extends over a top portion 718 of the second rail 707 and extends beyond the first side 714 and the second side 716 of the second rail 707. The positions and angles of the first and second outer mirrors 704, 706 allow the mirrors 704, 706 to reflect a top view of the rail 705, 707 that extends beyond the first and second sides 708, 710, 714, 716 of the rails 705, 707, respectively. A first inner mirror 732 is situated on the support structure 202 between the first and second outer mirrors 704, 706. The first inner mirror 732 corresponds to the first rail 705 and the first outer mirror 704. A second inner mirror 734 is also situated on the support structure 202 between the first and second outer mirrors 704, 706. The second inner mirror 734 corresponds to the second rail 707 and the second outer mirror 706, and is situated closer to the second rail 707 than the first inner mirror 732.

The first outer mirror 704 is positioned and angled such that it reflects an image corresponding to a top view of the first rail 705 that extends beyond the first and second sides 708, 710 of the first rail 705. The first inner mirror 732 is positioned and angled such that it reflects the image received from the first outer mirror 704 to a first portion 720 of the camera's field-of-view 703. The second outer mirror 706 is positioned and angled such that it reflects an image corresponding to a top view of the second rail 707 that extends beyond the first and second sides 714, 716 of the second rail 707. The second inner mirror 734 is positioned and angled such that it reflects the image received from the second outer mirror 706 to a second portion 722 of the camera's field-of-view 703. It should be noted that the heights of the mirrors relative to each other as shown in the figures are only used as non-limiting examples. For example, mirrors 732 and 734 can be higher, lower, or at the same height as mirrors 704 and 706. The same can apply to the mirrors shown in FIG. 5 as well.

As can be seen from the above discussion, one or more embodiments of the present invention provide a low-cost railroad track imaging system. This imaging system utilizes a combination of reflective devices and image capturing devices to reduce the number of image capturing devices required for imaging. Therefore, the imaging system is able to capture multiple views per camera, thereby reducing the overall cost of the system.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An imaging system comprising:
   a first image capturing device having a field of view; and
   a first plurality of reflective devices each configured to reflect an image into the field of view of the first image capturing device while the imaging system is moving along at least one railroad track rail,
   wherein a first reflective device in the first plurality of reflective devices is configured to reflect an image of at least a portion of a first side of a first railroad track rail within a first portion of the field-of-view of the first image capturing device,
   wherein a second reflective device, separate from the first reflective device, in the first plurality of reflective devices is configured to reflect an image of at least a portion of a second side of the first railroad track rail within a second portion of the first image capturing device's field-of-view, and outside of the first portion of the field-of-view of the first image capturing device, and
   wherein a third portion of the first image capturing device's field-of-view is of at least a portion of a top surface of the first railroad track rail; and
   further comprising:
   a second image capturing device having a field of view; and
   a second plurality of reflective devices each configured to reflect an image into the field of view of the second image capturing device while the imaging system is moving along at least one railroad track rail,
   wherein a first reflective device in the second plurality of reflective devices is configured to reflect an image of at least a portion of a first side of a second railroad track rail within a first portion of a field-of-view of the second image capturing device;
   wherein a second reflective device in the second plurality of reflective devices is configured to reflect an image of at least a portion of a second side of the second railroad track rail within a second portion of the second image capturing device's field-of-view, and outside of the first portion of the field-of-view of the second image capturing device, and wherein a third portion of the second image capturing device's field-of-view is of at least a portion of a top surface of the second railroad track rail.

2. The imaging system of claim 1, wherein the second image capturing device is a camera, and the camera of the second image capturing device contemporaneously captures the first portion, second portion, and third portion, of its field-of-view, and wherein the first image capturing device contemporaneously captures the first portion, second portion, and third portion, of its field-of-view.

3. The imaging system of claim 1, wherein the second plurality of reflective devices comprises a plurality of minors.

4. The imaging system of claim 1, wherein the first image capturing device is a camera, and the camera of the first image capturing device contemporaneously captures the first portion, second portion, and third portion, of its field-of-view.

5. The imaging system of claim 1, wherein the first plurality of reflective devices comprises a plurality of mirrors.

6. An imaging system comprising:
an image capturing device having a field of view;
a first plurality of reflective devices each configured to reflect an image into the field of view of the image capturing device while the imaging system is moving along at least one railroad track rail; and
at least a second plurality of reflective devices each configured to reflect an image into the field of view of the image capturing device while the imaging system is moving along the at least one railroad track rail,
wherein a first reflective device in the first plurality of reflective devices is configured to reflect a first image of at least a portion of a first side of a first railroad track rail to a first reflective device in the second plurality of reflective devices, and wherein the first reflective device in the second plurality of reflective devices is configured to reflect the first image within a first portion of the field-of-view of the image capturing device, and
wherein a second reflective device in the first plurality of reflective devices is configured to reflect a second image of at least a portion of a first side of a second railroad track rail to a second reflective device in the second plurality of reflective devices, and wherein the second reflective device in the second plurality of reflective devices is configured to reflect the second image within a second portion of the field-of-view of the image capturing device; and
further comprising:
a third plurality of reflective devices, wherein a first reflective device in the third plurality of reflective devices is configured to reflect a third image of at least a portion of a second side of the first railroad track rail within a third portion of the field-of-view of the image capturing device, and
wherein a second reflective device in the third plurality of reflective devices is configured to reflect a fourth image of at least a portion of a second side of the second railroad track rail within a fourth portion of the field-of-view of the image capturing device.

7. The imaging system of claim 6, wherein at least a top portion of the first reflective device in the third plurality of reflective devices is situated below and between a top portion of the first reflective device in the second plurality of reflective devices, and wherein at least a top portion of the second reflective device in the third plurality of reflective devices is situated below and between a top portion of the second reflective device in the second plurality of reflective devices.

8. The imaging system of claim 6, wherein at least a top portion of the first reflective device in the third plurality of reflective devices is situated below a top portion of the first reflective device in the first plurality of reflective devices, and wherein at least a top portion of the second reflective device in the second plurality of reflective devices is situated below a top portion of the second reflective device in the first plurality of reflective devices.

9. The imaging system of claim 6, wherein the third plurality of reflective devices comprises a plurality of minors.

10. The imaging system of claim 6, wherein at least a top portion of the first reflective device in the second plurality of reflective devices is situated above a top portion of the first reflective device in the first plurality of reflective devices, and wherein at least a top portion of the second reflective device in the second plurality of reflective devices is situated above a top portion of the second reflective device in the first plurality of reflective devices.

11. The image capturing device of claim 6, wherein the image capturing device is a camera.

12. The imaging system of claim 6, wherein the first plurality of reflective devices and the second plurality of reflective devices comprise a plurality of minors.

13. An imaging system comprising:
a support structure;
an image capturing device having a field of view; and
a plurality of reflective devices each configured to reflect an image into the field of view of the image capturing device while the imaging system is moving along at least one railroad track rail,
wherein the support structure comprises:
a first horizontal member;
a second horizontal member situated opposite to the first horizontal member;
a third horizontal member situated above and parallel to the first horizontal member;
a fourth horizontal member situated above and parallel to the second horizontal member;
a first vertical member coupled and perpendicular to the first and third horizontal members;
at least a second vertical member coupled and perpendicular to the second and fourth horizontal members;
a sixth horizontal member coupled to the first and second vertical members; and
a seventh horizontal member coupled and perpendicular to the second and third horizontal members,
wherein a first reflective device in the plurality of reflective devices is coupled to at least one of the sixth horizontal member and the first vertical member and configured to reflect an image of at least a portion of a first side of a railroad track rail within a first portion of the field of view of the image capturing device,
wherein a second reflective device in the plurality of reflective devices is coupled to at least one of the sixth horizontal member and the second vertical member and configured to reflect an image of at least a portion of a second side of the railroad track rail within a second portion of the field of view of the image capturing device, and outside of the first portion of the field of view of the image capturing device, and
wherein the image capturing device is movably coupled to the seventh horizontal member allowing adjustment of at least one of the location and the orientation of the image capturing device on the seventh horizontal member.

14. The imaging system of claim 13, wherein the first vertical member is movably coupled to the first and third horizontal members, and wherein the second vertical member is movably coupled to the second and fourth horizontal members.

15. The imaging system of claim 13, wherein the sixth horizontal member is movably coupled to the first and second horizontal members.

16. The imaging system of claim 13, wherein the first reflective device and the second reflective device are at least one of pivotably and slidably coupled to the sixth horizontal member.

17. The imaging system of claim 13, wherein the image capturing device is at least one of pivotably and slidably coupled to the seventh horizontal member allowing adjustment of the image capturing device in at least one of:
   its orientation, and
   its location along the seventh horizontal member of the image capturing device.

* * * * *